(12) United States Patent
Iesaki

(10) Patent No.: US 7,603,187 B2
(45) Date of Patent: Oct. 13, 2009

(54) ADAPATIVE CONTROL DEVICE, IMAGE FORMING APPARATUS, AND RECORDING MEDIUM

(75) Inventor: Kenichi Iesaki, Inazawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 147 days.

(21) Appl. No.: 11/862,745

(22) Filed: Sep. 27, 2007

(65) Prior Publication Data

US 2008/0082182 A1 Apr. 3, 2008

(30) Foreign Application Priority Data

Sep. 29, 2006 (JP) .............. 2006-267759

(51) Int. Cl.
  *G05B 13/02* (2006.01)
  *G05B 13/00* (2006.01)

(52) U.S. Cl. .............. 700/44; 700/28; 700/45; 318/561

(58) Field of Classification Search ............ 700/28, 700/44–45; 318/561
See application file for complete search history.

(56) References Cited

U.S. PATENT DOCUMENTS

| | | | | |
|---|---|---|---|---|
| 5,342,037 A | * | 8/1994 | Martin | 271/111 |
| 5,371,451 A | * | 12/1994 | Toyosawa et al. | 318/568.13 |
| 5,436,705 A | * | 7/1995 | Raj | 399/59 |
| 5,541,833 A | * | 7/1996 | Bristol et al. | 700/45 |
| 6,013,995 A | * | 1/2000 | Kim | 318/561 |
| 6,724,264 B2 | * | 4/2004 | Kondoh | 331/17 |
| 7,016,743 B1 | * | 3/2006 | Cheng | 700/45 |
| 7,451,004 B2 | * | 11/2008 | Thiele et al. | 700/28 |
| 2003/0153990 A1 | * | 8/2003 | Boiko | 700/37 |
| 2007/0021850 A1 | * | 1/2007 | Wojsznis et al. | 700/42 |

FOREIGN PATENT DOCUMENTS

| | | |
|---|---|---|
| JP | 2002-312004 | 10/2002 |
| JP | 2005-174082 | 6/2005 |
| JP | 2005-267296 | 9/2005 |
| JP | 2005-286459 | 10/2005 |

* cited by examiner

*Primary Examiner*—Ramesh B Patel
(74) *Attorney, Agent, or Firm*—Banner & Witcoff, Ltd

(57) ABSTRACT

An adaptive control device includes an identifier and a feedforward controller. The identifier estimates an unknown coefficient in a discrete-time transfer function model of a controlled object to identify the discrete-time transfer function model. Estimation is performed based on a manipulated variable supplied to the controlled object and a controlled variable of the controlled object to the given manipulated variable. When estimating each coefficient of the discrete-time transfer function model, the identifier estimates a single unknown coefficient in numerator in non-expanded form of the numerator.

12 Claims, 13 Drawing Sheets

ADAPATIVE CONTROL DEVICE, IMAGE FORMING APPARATUS, AND RECORDING MEDIUM

CROSS-REFERENCE TO RELATED APPLICATIONS

This application claims the benefit of Japanese Patent Application No. 2006-267759 filed Sep. 29, 2006 in the Japan Patent Office, the disclosure of which is incorporated herein by reference.

BACKGROUND

This invention relates to an adaptive control device that is designed to identify a discrete-time transfer function model P(z) of a controlled object and generate a feedforward manipulated variable using the inverse model of P(z). This invention also relates to an image forming apparatus mounting the adaptive control device thereon, and a recording medium.

Conventionally, a known method of controlling a controlled object in accordance with an input target value improves following capability and response capability of the controlled object by combining feedforward control and feedback control as shown in FIG. 9.

The control system shown in FIG. 9 is a double-degree-of-freedom system including a feedforward controller 101 with a transfer function model $C_{FF}$ and a feedback controller 102 with a transfer function model $C_{FB}$. The feedforward controller 101 generates and outputs a feedforward manipulated variable $u_{FF}$ to an input target value r. A subtractor 104 is provided which calculates a difference between the target value r and a control output value (controlled variable) y. The result e of calculation from the subtractor 104 is supplied to the feedback controller 102. Thereby, the feedback controller 102 generates and outputs a feedback manipulated variable $u_{FB}$. The manipulated variables $u_{FF}$ and $u_{FB}$ are added in an adder 105. The result of addition is supplied to a controlled object 103 as a manipulated variable u.

In the above structured control system, the transfer function model $C_{FF}$ of the feedforward controller 101 is expressed by the inverse model 1/P of the controlled object 103. Accordingly, in order to effectively operate this control system, it is necessary that the transfer function model $C_{FF}$ of the feedforward controller 101 sufficiently matches a transfer function model of the controlled object 103.

However, even if the overall system is structured by designing the feedforward controller 101 using a transfer function model which sufficiently matches actual characteristics of the controlled object 103 at design time, the characteristics of the controlled object 103 may be changed from those at the design time owing to various factors such as aging and environmental change. The greater the change is, that is, the larger the gap is between the characteristics of the controlled object 103 set in the feedforward controller 101 and the actual characteristics of the controlled object 103, the larger feedback manipulated variable $u_{FB}$ is generated and outputted from the feedback controller 102 in order to fill up the gap. This affects the following capability and response capability which are the advantages of the feedforward control. Degradation is caused in control performance.

To solve the above problem, a known adaptive control technique adds an adaptive identifier which adaptively performs model identification of the controlled object. The model identification is performed online and the result of identification is reflected in the feedforward control system.

FIG. 10 shows an adaptive control system which combines adaptive control into the control system of FIG. 9. The adaptive control system of FIG. 10 includes an adaptive identifier 107 added to the control system of FIG. 9. The feedforward controller 110 is designed to update the transfer function model $C_{FF}$ based on the result of identification by the adaptive identifier 107. Change, if any, in actual characteristics of the controlled object 103 is reflected in the feedforward controller 110. Use of the adaptive control technique may maintain optimum control performance at all times.

The adaptive identifier 107 estimates each parameter (coefficient) of a transfer function model P of the controlled object 103 to identify the controlled object 103. FIG. 11 shows the schematic structure of the adaptive identifier 107. As shown in FIG. 11, the adaptive identifier 107 includes a model identifier 111 and a subtractor 112. In FIG. 11, a transfer function model P(z) of the controlled object 103 and a transfer function model $\hat{P}(z)$ of the model identifier 111 (hereinafter, also referred to as "identification model") are both discrete-time transfer functions. Also, k indicates time (timing).

In the adaptive identifier 107, the model identifier 111 identifies the controlled object 103 to obtain the identification model $\hat{P}(z)$. That is, the model identifier 111 estimates each parameter of the transfer function model P(z) of the controlled object 103 to obtain the identification model $\hat{P}(z)$ based on a manipulated variable u(k) supplied to the controlled object 103 at a timing k and an actual controlled variable y(k) to the manipulated variable u(k). Estimation of each parameter is repeatedly performed until a difference $\tilde{e}(k)$ between the output from the model identifier 111 to the given manipulated variable u(k) (that is, the controlled variable $\hat{y}(k)$ of the identification model $\hat{P}(z)$ to the manipulated variable u(k)) and the actual control variable y(k) reaches a predetermined value (near zero) or below.

Particular identification (estimation) calculation in the adaptive identifier 107 is performed using a known adaptive update rule for a discrete-time transfer function model which is explained below.

If the discrete-time transfer function model P(z) of the controlled object 103 is expressed by equation (1), the actual controlled variable y(k) at a timing k is defined by equation (2).

$$P(z) = \frac{b_{n+1}z^n + b_n z^{n-1} + \ldots + b_2 z + b_1}{z^n + a_n z^{n-1} + \ldots + a_2 z + a_1} \quad (1)$$

$$y(k) = \theta^T v(k) \quad (2)$$

where
$\theta = [b_{n+1}, \ldots, b_1, a_n, \ldots, a_1]$
$v(k) = [u(k), u(k-1), \ldots, u(k-n), -y(n-1), \ldots, -y(k-n)]$ Here, why y(k) is defined by equation (2) is particularly explained, taking up the case when n=4, for example. When n=4, equation (1) can be expressed by equation (3) below.

$$P(z) = \frac{b_5 z^4 + b_4 z^3 + b_3 z^2 + b_2 z + b_1}{z^4 + a_4 z^3 + a_3 z^2 + a_2 z + a_1} \quad (3)$$

$$= \frac{b_5 + b_4 z^{-1} + b_3 z^{-2} + b_2 z^{-3} + b_1 z^{-4}}{1 + a_4 z^{-1} + a_3 z^{-2} + a_2 z^{-3} + a_1 z^{-4}}$$

Also, equation (4) below is established between the manipulated variable u(k) and the controlled variable y(k) to the controlled object 103.

$$P(z) = \frac{y(k)}{u(k)} \quad (4)$$

Accordingly, substituting equation (3) into equation (4) results in equation (5) below.

$$(b_5+b_4z^{-1}+b_3z^{-2}+b_2z^{-3}+b_1z^{-4})u(k)=(1+a_4z^{-1}+a_3z^{-2}+a_2z^{-3}+a_1z^{-4})y(k) \quad (5)$$

Here, 'z' is a known delay operator, and '$z^{-n}$' means to delay time (timing) by n timing. Accordingly, equation (5) is reexpressed to define y(k) by equation (6) below.

$$\begin{aligned} y(k) &= (b_5 + b_4z^{-1} + b_3z^{-2} + b_2z^{-3} + b_1z^{-4})u(k) - \\ &\quad (a_4z^{-1} + a_3z^{-2} + a_2z^{-3} + a_1z^{-4})y(k) \\ &= b_5u(k) + b_4u(k-1) + b_3u(k-2) + b_2u(k-3) + \\ &\quad b_2u(k-3) + b_1u(k-4) - \left\{ \begin{array}{l} a_4y(k-1) + a_3y(k-2) + \\ a_2y(k-3) + a_1y(k-4) \end{array} \right\} \end{aligned} \quad (6)$$

The equations (3) to (6) show the examples when n=4. Equation (6), if generalized, can be expressed as the aforementioned equation (2).

If each parameter to be estimated, that is, an identification parameter $\hat{\theta}(k)$ (an estimated value of $\theta$) is defined by equation (7) below, estimate calculation of this identification parameter $\hat{\theta}(k)$ is carried out according to the adaptive update rule defined by equation (8) below. L in equation (8) indicates adaptive gain.

$$\hat{\theta}(k)=[\hat{b}_{n+1}, \ldots \hat{b}_1, \hat{a}_n, \ldots, \hat{a}_1] \quad (7)$$

$$\hat{\theta}(k)=\hat{\theta}(k-1)-Lv(k)\tilde{e}(k) \quad (8)$$

Calculation according to the adaptive update rule of equation (8) is repeatedly performed until the difference $\tilde{e}(k)$ is equal to a predetermined value or below as noted above. In other words, calculation according to the above adaptive update rule is carried out until the previously estimated identification parameter $\hat{\theta}(k-1)$ is nearly equal (ideally, completely equal) to the currently estimated identification parameter $\hat{\theta}(k)$. In this manner, $\hat{\theta}(k)$ is converged to a true value.

In this manner, when identifying a transfer function model of a controlled object according to adaptive control, the transfer function model is defined by a discrete-time transfer function in consideration that the control system according to adaptive control is actually mounted on various apparatus and devices. Thereafter, each coefficient (parameter) of a numerator and a denominator of the transfer function is estimated.

SUMMARY

However, depending on a transfer function model of a controlled object, an identification model $\hat{P}(z)$ obtained by identification has an unstable zero point. Construction of a feedforward controller with the inverse model $1/\hat{P}(z)$ may sometimes produce an unstable system.

Particularly, if a controlled object is defined by a zeroth-degree/nth-degree continuous-time transfer function model P(s) like equation (9) below for example, and the transfer function model P(s) is transformed into a discrete-time transfer function model P(z) by substituting equation (10) into P(s), that is so-called bilinear transformation, the numerator inevitably includes an expression (z+1) as shown in equation (11). This means that there is a zero point at stability limit.

$$P(s) = \frac{b'}{a'_{n+1}s^n + a'_n s^{n-1} + \ldots + a'_2 s + a'_1} \quad (9)$$

$$s = \frac{2}{T_s} \frac{z-1}{z+1} \quad (10)$$

$$P(z) = \frac{b'(z+1)^n}{a'_{n+1}(z-1)^n + a'_n(z-1)^{n-1}(z+1) + \ldots + a'_2(z-1)(z+1)^{n-1} + a'_1(n+1)^n} \quad (11)$$

Accordingly, if equation (11) is expanded in terms of z in accordance with the general adaptive update rule shown by equation (8) and identification is performed by estimation of each coefficient, the accuracy of the identification may not be sufficient or the identification model $\hat{P}(z)$ has an unstable zero point due to numerical errors of the processors which perform calculation.

In explanation by means of a more particular example of numeric values, equation (11) can be expressed by equation (12) below when n=4.

$$P(z) = \frac{b_5 z^4 + b_4 z^3 + b_3 z^2 + b_2 z + b_1}{z^4 + a_4 z^3 + a_3 z^2 + a_2 z + a_1} \quad (12)$$

Applying the adaptive update rule of equation (8) to equation (12), the identification parameter $\hat{\theta}(k)$ which is the estimated value of each coefficient of the numerator and the denominator is obtained. The results of calculation are shown in TABLE 1.

TABLE 1

Numeric Value Resulted from Identification of Numerator Coefficient

| | $\alpha$ | | | | |
|---|---|---|---|---|---|
| | 5 | 4 | 3 | 2 | 1 |
| $b_\alpha$ | 1.7151345150e−3 | 6.8605380600e−3 | 1.0290807090e−2 | 6.8605380600e−3 | 1.7151345150e−3 |
| $\hat{b}_\alpha$ | 1.7154932067e−3 | 6.8605419874e−3 | 1.0291315444e−2 | 6.8593133861e−3 | 1.7155712647e−3 |

TABLE 1 shows only the numerator coefficients of equation (12). In TABLE 1, $b_a$ is a simulated value of a transfer function model of the preset controlled object, and $\hat{b}_a$ is an estimate resulted from application of the adaptive update rule. As far as seen from TABLE 1, each estimated numerator coefficient $\hat{b}_a$ almost corresponds to the simulated value $b_a$. Identification seems to have been performed almost normally.

However, $\hat{b}_a$ is not completely identical to $b_a$ although nearly identical to $b_a$. That is, the actual coefficients of the controlled object are not accurately estimated. This derives from numeric error and calculation performance of the processor which performs calculation for identification, which is something that is unable to prevent. Thus, as shown in a pole-zero map of FIG. 12, the identification model $\hat{P}(z)$ obtained by identification has an unstable zero point. Four circles in FIG. 12 (in the vicinity of −1 on real axis and zero on imaginary axis) are zero points of the identification model $\hat{P}(z)$.

That is, when the numerator of the transfer function is expressed by $b'(z+1)^4$, zero points theoretically exist at stability limit, that is, at −1 on real axis and zero on imaginary axis as multiple roots. However, when this numerator is expanded to polynomial expression of z to apply the adaptive update rule and each coefficient (parameter) is estimated, a slight error occurs in the resulted estimate, as shown in TABLE 1. Due to this error, the polynomial expression of the numerator including each estimated coefficient $\hat{b}_a$ cannot be restored to the original form of $b'(z+1)^4$. As shown in FIG. 12, the polynomial expression has four zero points including an unstable zero point.

Accordingly, if an inverse model of the identification model $\hat{P}(z)$ having an unstable zero point is applied to the feedforward controller 110, the feedforward manipulated variable $u_{FF}$ from the feedforward controller 110 is diverged as shown in FIG. 13. This problem is not limited to the case in which there is a zero point at stability limit in a numerator of a transfer function model P(z) of a controlled object. Even if a zero point of P(z) exists in stability region, the identification model $\hat{P}(z)$ may have an unstable zero point depending on level of calculation accuracy and numeric error upon identification.

In one aspect of the present invention, it would be desirable to inhibit an identification model obtained by identifying a discrete-time transfer function model of a controlled object from having an unstable zero point which derives from error resulted by identification, in the case where a zero point of the transfer function model exists in stability region.

The first aspect of the present invention may provide an adaptive control device that includes an identifier and a feedforward controller. The identifier estimates an unknown coefficient in a discrete-time transfer function model P(z) (z: delay operator) of a controlled object to identify the discrete-time transfer function model P(z), Estimation is performed based on a manipulated variable supplied to the controlled object and a controlled variable of the controlled object to the given manipulated variable. The feedforward controller is expressed by a discrete-time transfer function model using an inverse model $1/\hat{P}(z)$ of an identification model $\hat{P}(z)$ which is resulted from identification by the identifier. The feedforward controller generates a feedforward manipulated variable as at least a part of the manipulated variable to an input controlled object value.

The controlled object is configured such that the discrete-time transfer function model P(z) of the controlled object is expressed by equation (13) below. The identifier, when estimating each coefficient $b, a_1, \ldots, a_n$ of the discrete-time transfer function model P(z) of equation (13), estimates a single unknown coefficient b in numerator in non-expansion form of the numerator.

$$P(z) = \frac{b(z^n + h_n z^{n-1} + \ldots + h_2 z + h_1)}{z^n + a_n z^{n-1} + \ldots + a_2 z + a_1} \quad (13)$$

where $b, a_1, \ldots, a_n$: unknown coefficient, and
$h_1, \ldots, h_n$: known real number Conventionally, as noted above, both the numerator and the denominator of equation (13) have been expanded when identifying a discrete-time system transfer function P(z). The aforementioned adaptive update rule has been applied to P(z) after expansion. Then, each coefficient of the numerator and the denominator has been estimated. That is, when expanded, the numerator of equation (13) can be expressed by equation (14) below. Each coefficient $b, b_n, \ldots, b_2, b_1$ has been individually estimated as unknown coefficient.

$$\begin{aligned}\text{numerator} &= bz^n + bh_n z^{n-1} + \ldots + bh_2 z + bh_1 \\ &= bz^n + b_n z^{n-1} + \ldots + b_2 z + b_1\end{aligned} \quad (14)$$

Accordingly, as noted above, there has been error deriving from the identification accuracy and the calculation error (numeric error) in identification between the resulted estimate of each coefficient $b, b_n, \ldots, b_2, b_1$ and each coefficient of the actual transfer function model.

In the present invention, when the identifier identifies the transfer function P(z) of equation (13), a single unknown coefficient b is estimated without expansion of the numerator as before (i.e., in a state that the zero point is fixed). Owing to estimation of the single coefficient b in the numerator in this manner, the zero point of the obtained identification model $\hat{P}(z)$ remains unchanged from the zero point in the transfer function model P(z) of equation (13).

According to the adaptive control device in the first aspect, the identification model $\hat{P}(z)$ can be inhibited from having an unstable zero point deriving from error resulted from identification by the identifier, in the case where a zero point of the transfer function model P(z) exists in stability region. Thus, the feedforward controller can generate a stable feedforward manipulated variable. Control performance of the adaptive control device can be maintained in a favorable manner. Moreover, the coefficient to be estimated of the numerator of P(z) is just one irrespective of order of z. Thus, time necessary for identification can be shortened.

A second aspect of the present invention may provide an image forming apparatus that includes a conveyor device, an image forming device, and the adaptive control device in the first aspect. The conveyor device conveys a recording medium along a predetermined conveyor path. The image forming device forms an image on the recording medium conveyed by the conveyor device. The adaptive control device controls a motor and a driving mechanism driven by the motor of the image forming apparatus as the controlled object.

According to the image forming apparatus above, the motor and the driving mechanism can be controlled in a stable manner, using the adaptive control device in the first aspect.

A third aspect of the present invention may provide a computer readable recording medium that stores a program which makes a computer function as the identifier.

According to the recording medium above, it is possible to make a computer function as the identifier. As a result, the identification model $\hat{P}(z)$ can be inhibited from having an unstable zero point deriving from error resulted from identification, in the case where a zero point of the transfer function model P(z) exists in stability region.

The above program may be read by the computer from a computer readable carrier other than a physical recording medium such as a ROM, a CD, for example.

A fourth aspect of the present invention may provide a program that makes a computer function as the identifier.

According to the program above, it is possible to make a computer function as the identifier. As a result, the identification model $\hat{P}(z)$ can be inhibited from having an unstable zero point deriving from error resulted from identification, in the case where a zero point of the transfer function model P(z) exists in stability region.

BRIEF DESCRIPTION OF THE DRAWINGS

The invention will now be described below, by way of example, with reference to the accompanying drawings, in which.

Figure 1:
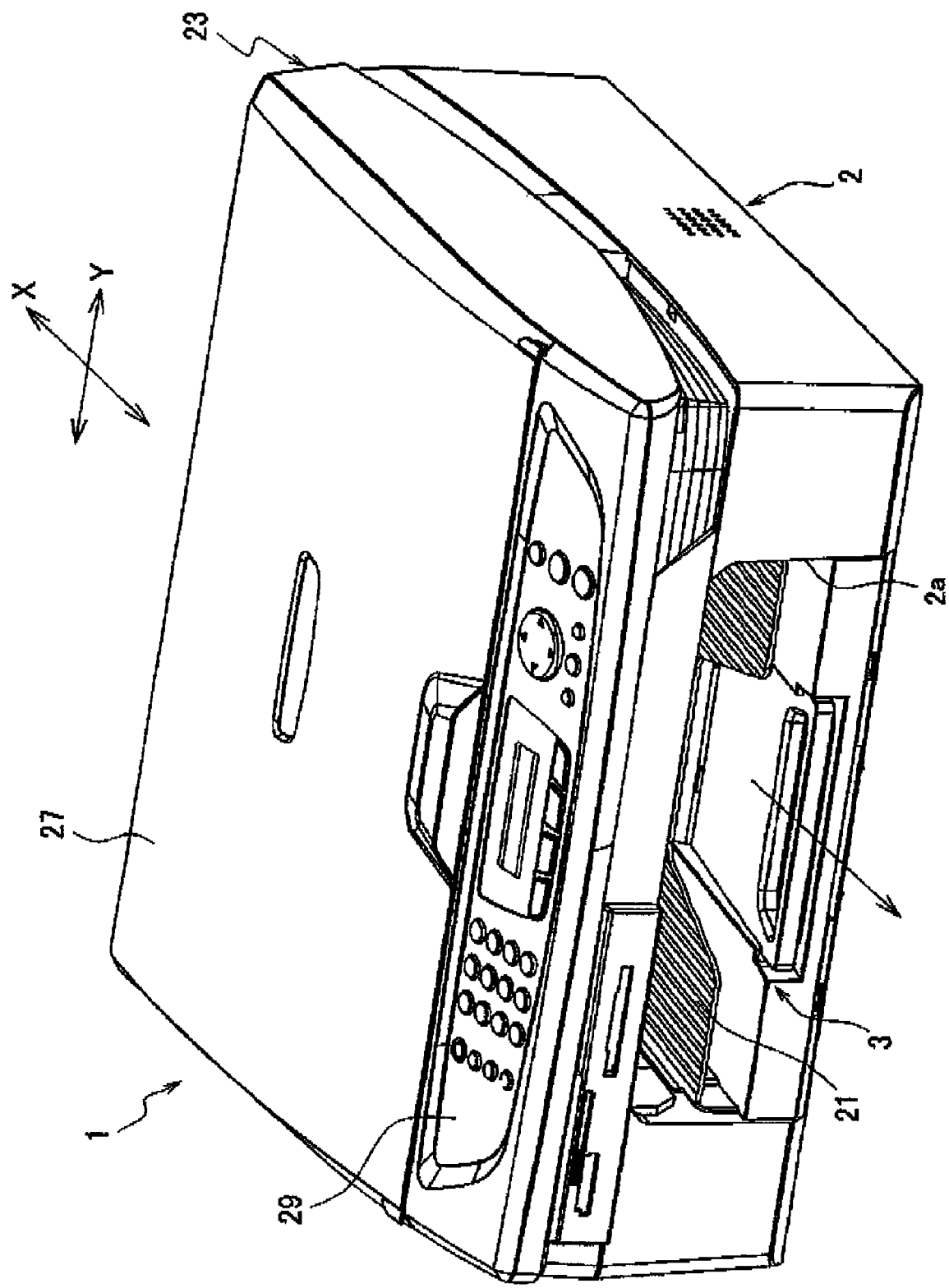
FIG. 1 is a perspective view of a multi function apparatus according to an embodiment.
Figure 2:
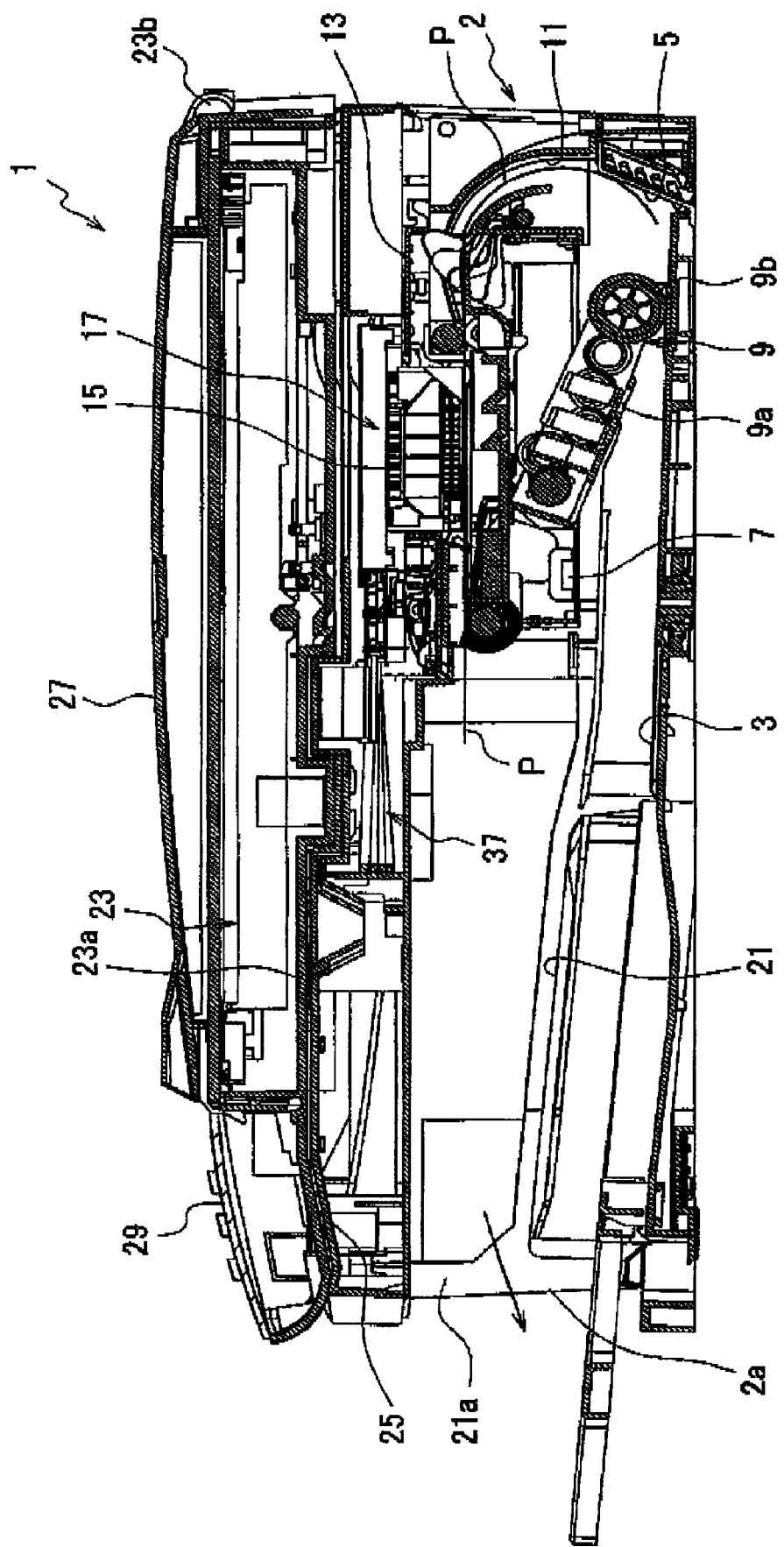
FIG. 2 is a cross sectional side view of the multi function apparatus according to the embodiment.

DETAILED DESCRIPTION OF THE PREFERRED EMBODIMENT (1) Overall Structure of Multi Function Apparatus Referring to FIGS. 1 and 2, a multi function apparatus 1 of the present embodiment is provided with a printer function, a copying function, a scanner function and a facsimile function. The multi function apparatus 1 is provided with a paper cassette 3 at the bottom of a housing 2 made of synthetic resin.

The paper cassette 3 can be inserted through an opening 2a formed at the front of the housing 2. The paper cassette 3 is designed to store a plurality of paper P which are cut into A4 size or legal size, for example. At the back of the paper cassette 3, a bank 5 for paper separation is arranged.

In the multi function apparatus 1, a feeder arm 9a composing a feeder 9 is turnably attached to the bottom plate of a box-like main frame 7 made of metal, so as to swing up and down on its anchor end. The paper P stacked (accumulated) in the paper cassette 3 are separated and conveyed sheet by sheet by a feeder roller 9b provided at a lower end of the feeder arm 9a and the bank 5. Each separated paper P is conveyed to an image forming portion 13 provided above (at a higher position of) the paper cassette 3 via a U-turn path 11 composing a U-shaped conveyor path.

The image forming portion 18 includes a carriage 17. The carriage 17 is mounted on an ink-jet recording head 15 and can reciprocate in a main scanning direction. The carriage 17 is controlled by a later explained CPU 51 to make the recording head 15 scan in the main scanning direction. The recording head 15 ejects ink at the time of scanning to form an image on the paper P located therebelow. A paper discharge portion 21 discharges the paper P having an image formed thereon by the image forming portion 13. The paper discharge portion 21 is provided above the paper cassette 3. A paper discharge opening 21a which communicates with the paper discharge portion 21 opens together with the opening 2a at the front of the housing 2.

An image reading apparatus 23 for use in reading a document is provided above the housing 2. The image reading apparatus 23 is arranged such that a bottom wall 23a thereof is placed onto an upper cover body 25 without leaving any substantial space therebetween. The image reading apparatus 23 is designed to be opened and closed with respect to one end of the housing 2 via a not shown pivot shank. Also, a back end of a cover body 27 which covers the upper surface of the image reading apparatus 23 is turnably attached so as to swing up and down with respect to a back end of the image reading apparatus 23 about a pivot shaft 23b.

An operation panel 29 including various operation buttons and a liquid crystal display is provided at the front of the image reading apparatus 23. A not shown ink storage which opens upward is provided at the front part of the housing 2 covered by the image reading apparatus 23. Four ink cartridges are provided in the ink storage, which respectively store four colors (black, cyan, magenta and yellow) of ink for full color recording. The respective ink cartridges can be attached and detached from above. In the multi function apparatus 1 of the present embodiment, ink stored in the respective ink cartridges is supplied to the recording head 15 via a plurality of ink supply tubes 37 which connect the respective ink cartridges with the recording head 15.

(2) Structure of Paper Conveying System

Figure 3:
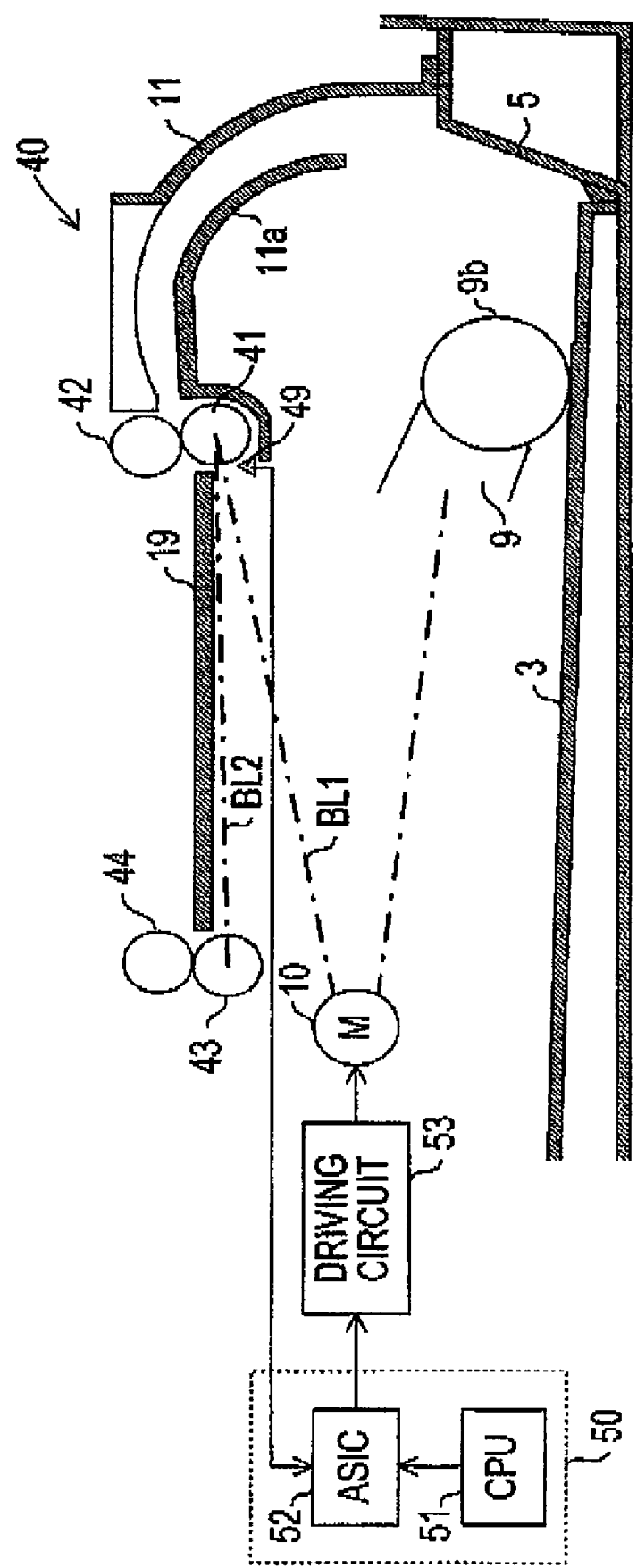
FIG. 3 is an explanatory diagram showing a conveyor and a conveyor controller composing a paper conveying system provided in the multi function apparatus.

Now, a paper conveying system provided in the multi function apparatus 1 will be explained. FIG. 3 is an explanatory diagram showing a schematic structure of a conveyor 40 and a conveyor controller 50 composing a paper conveying system of the multi function apparatus 1. FIG. 3 diagrammatically shows the respective portions of the multi function apparatus 1 of FIGS. 1 and 2 from the viewpoint of paper conveyance. The components identical to those of FIGS. 1 and 2 are given the same reference numbers.

As seen from FIG. 3, the conveyor 40 of the multi function apparatus 1 includes the paper cassette 3, the feeder 9, a conveyor roller 41, a pinch roller 42, a paper discharge roller 43, a pinch roller (spur roller) 44, the bank 5, the U-turn path 11 and a platen 19, a LP (Line Feed) motor (hereinafter, referred to just as "motor") 10, the belt BL1, BL2, and a driving circuit 53. The feeder 9 separates and delivers the paper P accommodated in the paper cassette 3 sheet by sheet. The conveyor roller 41 conveys the paper P delivered by the feeder roller 9b of the feeder 9 to the underneath of the recording head 15. The pinch roller 42 faces the conveyor roller 41 in a pressed manner. The paper discharge roller 43 discharges the paper P to the paper discharge portion 21 after image forming while assisting paper conveyance at image forming operation. The pinch roller 44 faces the paper discharge roller 43 in a pressed manner. The bank 5, the U-turn path 11 and the platen 19 compose a conveyor path of the paper P. The motor 10 is a driving source of the conveyor roller 41 and the paper discharge roller 43. The belt BL1, BL2 transmits a force generated by the motor 10. The driving circuit 53 drives the motor 10 based on various commands (control signal) provided by an ASIC (Application Specific Integrated Circuit) 52.

The bank 5 and the U-turn path 11 composing the upstream conveyor path regulate movement of the paper P delivered by the feeder roller 9b, and guide the paper P to a contact point between the conveyor roller 41 and the pinch roller 42. On the downstream side in a conveying direction of the paper P in the U-turn path 11, a support 11a is provided which regulates downward movement of the paper P and guides the paper P to a contact point between the conveyor roller 41 and the pinch roller 42.

Accordingly, the paper P delivered from the paper cassette 3 is guided to the contact point between the conveyor roller 41 and the pinch roller 42 by way of the bank 5, the U-turn path 11 and the support 11a. In this state, when the conveyor roller 41 is rotated in the conveying direction (counterclockwise in FIG. 3), the paper P is pulled in between the conveyor roller 41 and the pinch roller 42 to be held therebetween. Thereafter, together with rotation of the conveying roller 41, the paper P is conveyed toward the paper discharge roller 43, that is, along the conveying direction, by a distance equivalent to the amount of rotation of the conveying roller 41.

The platen 19 composes a downstream conveyor path connecting the conveyor roller 41 to the paper discharge roller 43. The platen 19 is provided between the conveyor roller 41 and the paper discharge roller 43 along the path connecting therebetween. The platen 19 guides the paper P delivered from the conveyor roller 41 to an area in which an image is formed by the recording head 15. The platen 19 also guides the paper P having an image formed thereon by the recording head 15 to a contact point between the paper discharge roller 43 and the pinch roller 44.

The motor 10 includes a DC motor. The motor 10 is driven by the driving circuit 53. The rotational force is transmitted to the conveyor roller 41 via the belt BL1 which extends between the motor 10 and the conveyor roller 41. Thereby, the conveyor roller 41 is rotated. Moreover, the rotational force transmitted to the conveyor roller 41 is transmitted to the paper discharge roller 43 via the belt BL2 which extends between the conveyor roller 41 and the paper discharge roller 48. As a result, the paper discharge roller 43 is rotated in the same direction together with the conveyor roller 41. The rotational force generated from the motor 10 is transmitted to the feeder roller 9b via a not shown transfer mechanism. As a result, the feeder roller 9b is rotated.

The feeder roller 9b is rotated in the conveying direction of the paper P and delivers the paper P toward the conveyor roller 41 at paper feeding operation. The feeder roller 9b runs idle without receiving the rotational force from the motor 10 at image forming operation. That is, the transfer mechanism connecting the feeder roller 9b and the motor 10 transfers the rotational force to the feeder roller 9b only at paper feeding operation while disconnecting a built-in gear so as not to transmit the rotational force to the feeder roller 9b at image forming operation. Paper feeding operation here means to rotate the feeder roller 9b in a pressed manner against the paper P at the top-most position in the paper cassette 3, and conveys the front end of the paper P to a resist position, that is, the contact point between the conveyor roller 41 and the pinch roller 42.

The conveyor 40 includes a rotary encoder 49 that outputs pulse signal every time the conveyor roller 41 is rotated a predetermined amount. The output signal of this rotary encoder 49 is supplied to the ASIC 52 of the conveyor controller 50. Accordingly, in the multi function apparatus 1, the amount of rotation of the motor 10, the conveyor roller 41 and the paper discharge roller 43, as well as a moving distance (conveyor distance) of the paper P conveyed by the respective rollers 41 and 43 can be detected by detecting and counting the pulse signal from the encoder 49.

Paper conveyance at image forming operation is achieved as the paper P is sequentially fed in a sub-scanning direction (paper conveying direction) by a predetermined amount. Particularly, when the reciprocatable recording head 15 performs recording for one path in the main scanning direction, the paper P is fed in the sub-scanning direction by a predetermined amount and stopped for recording the next path.

Recording in the main scanning direction for the path is performed by the recording head 15. When recording is ended, the paper P is again fed in the sub-scanning direction by a predetermined amount and stopped for recording the next path. Recording in the main scanning direction for the path is performed by the recording head 15. That is, paper feeding by the predetermined amount in the sub-scanning direction is sequentially repeated until recording onto the paper P is completed.

(3) Structure of Conveyor Controller

The conveyor controller 50 connected to the driving circuit 53 of the conveyor 40 supplies commands (e.g., PWM signal) for the motor 10 to the driving circuit 53 to control the rotation of the motor 10 in the conveyor 40. The conveyor controller 50 indirectly controls paper conveyance by the conveyor roller 41. The conveyor controller 50 is mainly composed of the CPU 51 and the ASIC 52. The CPU 51 integrally controls the multi function apparatus 1. The ASIC 52 controls the rotation velocity and rotation direction of the motor 10.

Figure 4:
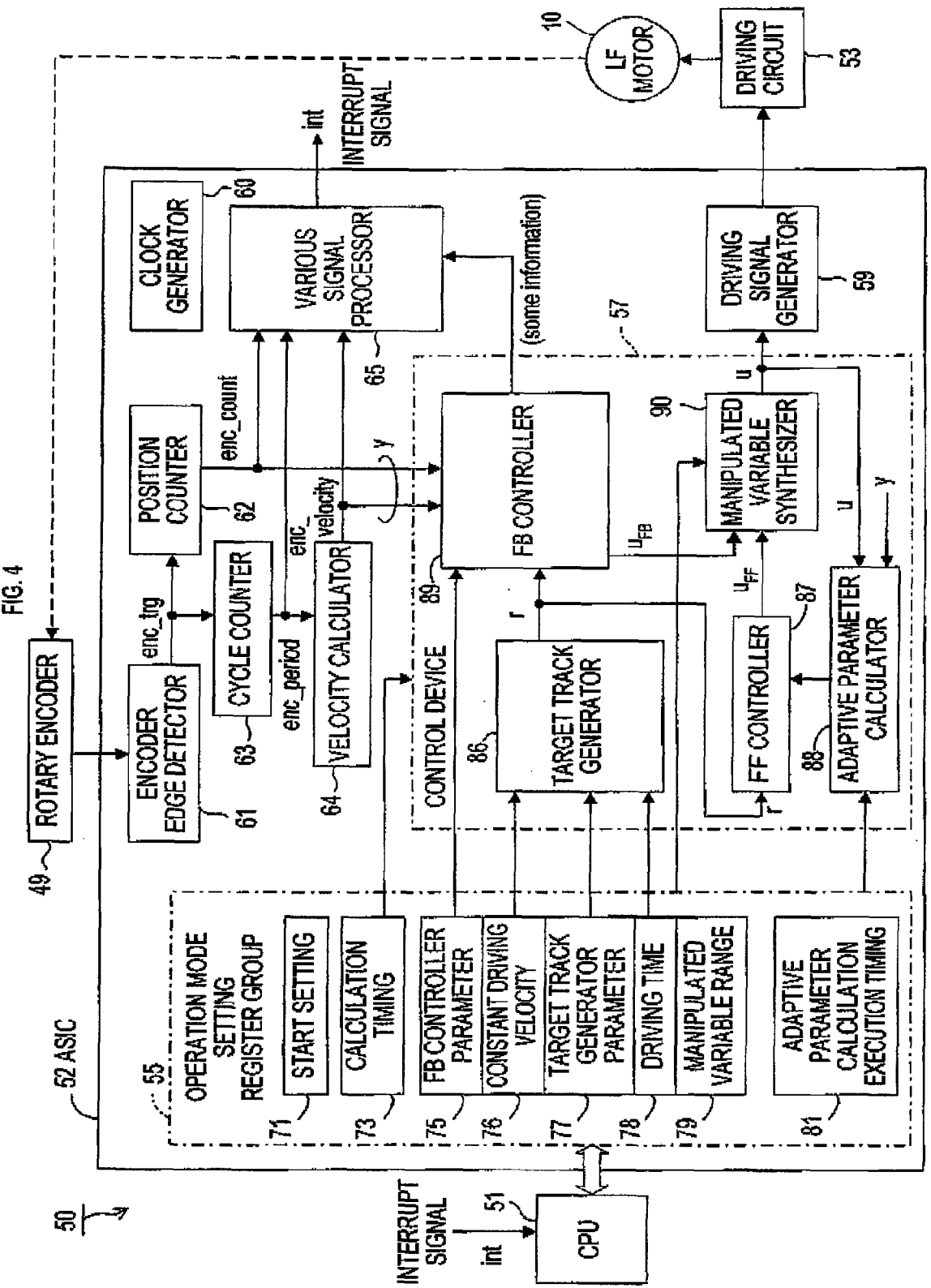
FIG. 4 is a block diagram showing a structure of the conveyor controller.

FIG. 4 is an explanatory view showing a structure of the conveyor controller 50. Hereinafter, explanation is given mainly on control upon conveying the paper P at image forming operation, as well as settings and calculation of parameters used in the control (particularly, later explained identification of a transfer function model of a controlled object). Accordingly, FIG. 4, only shows the components necessary for motor control (paper conveying control) at image forming operation and calculation of the above parameters. The CPU 51 in the present embodiment includes a ROM, a RAM, and a communication interface therein.

The conveyor controller 50 generates the PWM signal for controlling rotation velocity and rotation direction of the motor 10 and outputs the same to the driving circuit 53. The driving circuit 53 includes four switching elements (e.g., FET: Field Effect Transistor) and a known H-bridge circuit composed of a flywheel diode connected in parallel to the respective switching elements. The driving circuit 53 controls a current carried to the motor 10 by switching ON/OFF the switching elements in response to the driving signal (PWM signal) from the outside.

The ASIC 52 includes an operation mode setting register group 55 that stores various parameters necessary for drive control of the motor 10 by operation of the CPU 51.

The operation mode setting register group 55 includes a start setting register 71, a calculation timing setting register 73, a feedback controller parameter setting register 75, a constant driving velocity setting register 76, a driving time setting register 78, a target track generator parameter setting register 77, a manipulated variable range setting register 79, and an adaptive parameter calculation execution timing setting register 81. The start setting register 71 is used for starting the motor 10. The calculation timing setting register 73 is used for setting a calculation timing when a control device 57 calculates a manipulated variable u for use in controlling the motor 10. The feedback controller parameter setting register 75 is used for setting various control parameters used when a feedback (FB) controller 89 inside the control device 57 generates a later explained feedback controlled variable $u_{FB}$. The constant driving velocity setting register 76 is used for setting a constant driving velocity for use when a target track generator 86 inside the control device 57 generates a control target value (position track and velocity track in particular; hereinafter, referred to just as "target value") r. The driving time setting register 78 is used for setting driving time for use when the target track generator 86 generates the target value r. The target track generator parameter setting register 77 is used for setting a parameter of a function for use when the target track generator 86 generates the target value r based on the above constant driving velocity and driving time. The manipulated variable range setting register 79 is used for setting an upper limit and a lower limit of the manipulated variable u calculated in the control device 57. The adaptive parameter calculation execution timing setting register 81 is used for setting a timing at which an adaptive parameter calculator 88 inside the control device 57 executes identification of a transfer function model of the controlled object (that is, estimation of each parameter (coefficient) of a discrete-time transfer function model P(z) of the controlled object). Each setting parameter is written to each of the setting registers by the CPU 51.

The constant driving velocity represents a velocity at constant drive in conveying operation upon conveying the paper P per one path. In the conveying operation of the present embodiment, the motor 10 at a stopped state is gradually accelerated. When the velocity reaches a certain velocity (the aforementioned constant driving velocity), the motor 10 is constantly driven at the velocity for a certain period. Thereafter, the motor 10 is gradually decelerated to be stopped at a predetermined target stop position. This operation is repeated per one path of paper conveyance. Also, the driving time set in the driving time setting register 78 represents each driving time of acceleration driving time, constant driving time and deceleration driving time in particular. Accordingly, these driving time are stored in the driving time setting register 78.

In addition to the aforementioned operation mode setting register group 55, the ASIC 52 includes a clock generator 60, an encoder edge detector 61, a position counter 62, a cycle counter 63, a velocity calculator 64, the control device 57, a driving signal generator 59, and a various signal processor 65. The clock generator 60 generates and supplies, to the respective portions of the ASIC 52, clock signal having a cycle sufficiently shorter than encoder signal from the rotary encoder 49. The encoder edge detector 61, the position counter 62, the cycle counter 68, and the velocity calculator 64 serve altogether to detect position and moving velocity of the conveyor roller 41 (and further, position and moving velocity of the paper P) based on encoder signal from the rotary encoder 49. The control device 57 calculates the manipulated variable u (PWM duty ratio) of the motor 10 based on the result of detection by the position counter 62 and the velocity calculator 64 and the various parameters set in the operation mode setting register group 55. The driving signal generator 59 generates PWM signal for duty driving the motor 10 based on the manipulated variable u calculated in the control device 57 to be supplied to the driving circuit 53. The various signal processor 65 processes and outputs to the CPU 51 various signal generated inside the ASIC 52.

As noted above, the rotary encoder 49 detects rotation of the conveyor roller 41 driven by the motor 10. The rotary encoder 49 outputs two types of pulse signal (phase A signal and phase B signal) which are shifted each other by a predetermined cycle (¼ cycles, for example) according to conveying operation of the paper P. When the conveyor roller 41 is rotated in a direction for conveying the paper P, the phase of the phase A signal is advanced ahead of the phase of the phase B signal by the predetermined cycle. When the conveyor roller 41 is rotated in reverse, the phase of the phase A signal is delayed from the phase of the phase B signal by the predetermined cycle.

The encoder edge detector 61 takes in the encoder signal in the respective phases A and B to detect edges indicating the beginning/end of each cycle of the phase A signal and rotational direction of the motor 10. The encoder edge detector 61 outputs encoder edge detection signal (enc_trg) to the position counter 62 and the cycle counter 63.

The position counter 62 counts up or down a count value (enc_count) by the edge detection signal (enc_trg) according to the rotational direction of motor 10 (i.e., the conveying direction of the paper P) detected by the encoder edge detector 61 to detect conveying distance (position) of the paper P per one path. The count value (enc_count) is outputted to the control device 67 and the various signal processor 65.

The cycle counter 63 is initialized each time the edge detection signal (enc_trg) is supplied from the encoder edge detector 61. The cycle counter 63 counts the clock signal to measure the time elapsed after the edge detection signal input. Edge interval time (enc_period) indicating the result of time measurement is outputted to the velocity calculator 64 and the various signal processor 65.

The velocity calculator 64, in synchronization with the edge detection signal (enc_trg), calculates rotational velocity (enc_velocity) of the conveyor roller 41 based on physical resolution of the rotary encoder 49 and the edge interval time (enc_period) counted (measured) by the cycle counter 68 within the previous one cycle of the phase A signal.

The count value (enc_count) from the position counter 62 and the rotational velocity (enc_velocity) from the velocity calculator 64 are fed back to a feedback controller 89 as an actual controlled variable y of the controlled object (motor 10) to the given manipulated variable u. The controlled variable y is also inputted to an adaptive parameter calculator 88 to be used in calculation for identifying a transfer function model of the controlled object.

The control device 57 includes the target track generator 86, a feedforward controller 87, the adaptive parameter calculator 88, the feedback controller 89, and a manipulated variable synthesizer 90. The target track generator 86 generates various target tracks (target value r). The feedforward controller 87 generates the feedforward manipulated variable $u_{FF}$ as the manipulated variable by the feedforward control. The adaptive parameter calculator 88 identifies a discrete-time transfer function model P(z) of the controlled object so as to output each parameter of the obtained identification model $\hat{P}(z)$ to the feedforward controller 87. The feedback controller 89 generates the feedback manipulated variable $u_{FB}$ as the manipulated variable by the feedback control. The manipulated variable synthesizer 90 combines (adds) the above two manipulated variables $u_{FF}$ and $u_{FB}$ to generate the manipulated variable u to be supplied to the driving signal generator 59.

The target track generator 86 generates the target value r (target velocity track and target position track) based on the constant driving velocity set in the constant driving velocity setting register 76 and the driving time set in the driving time setting register 78.

The feedback controller 89 takes in the actual position (enc_count) of the controlled object and the actual velocity (enc_velocity), that is, the control variable y of the controlled object, so as to compare the controlled variable y with the target value r from the target track generator 86. According to the result of comparison, the feedback manipulated variable $u_{FB}$ is calculated which minimizes the difference between the controlled variable y and the target value r. The feedback manipulated variable $u_{FB}$ is outputted to the manipulated variable synthesizer 90.

The adaptive parameter calculator 88 estimates each parameter of the discrete-time transfer function model P(z) of the controlled object and performs calculation for deriving the identification model $\hat{P}(z)$. The obtained identification model $\hat{P}(z)$ is used in the feedforward controller 87.

The feedforward controller 87 includes an inverse model $1/\hat{P}(z)$ of the identification model $\hat{P}(z)$ obtained in the adaptive parameter calculator 88. The feedforward controller 87 generates the feedforward manipulated variables $u_{FF}$ to the input target value r. In the present embodiment, identification of the discrete-time transfer function model P(z) by the adaptive parameter calculator 88 is performed at a predetermined timing (details will be explained later). The obtained identification model $\hat{P}(z)$ is reflected in the feedforward controller 87.

Figure 10:
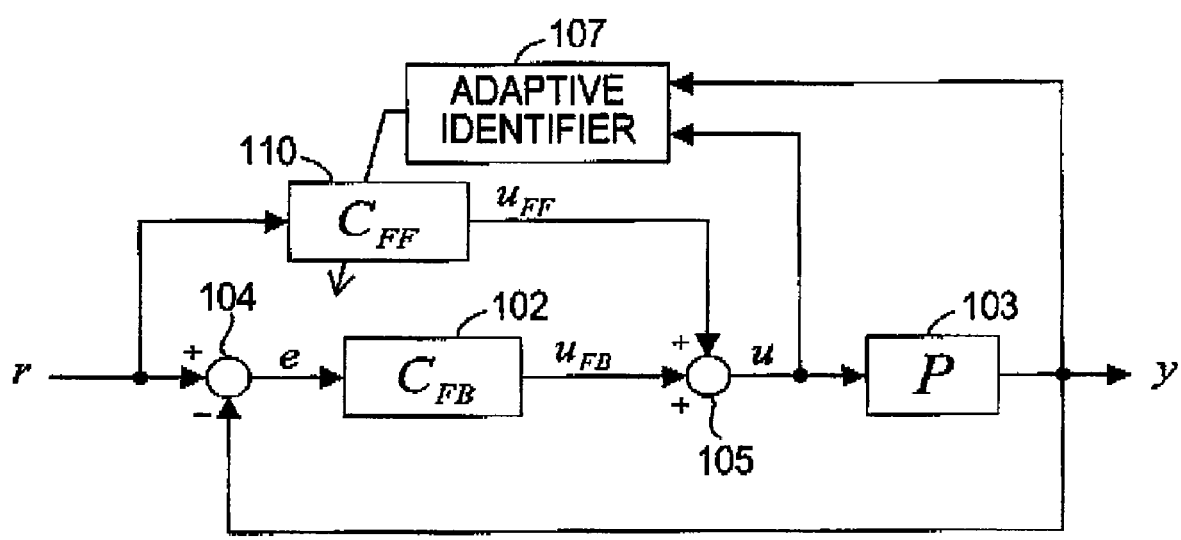
FIG. 10 is a block diagram showing a schematic structure of an adaptive control system in which adaptive control is combined with the conventional double-degree-of-freedom control system.
Figure 11:
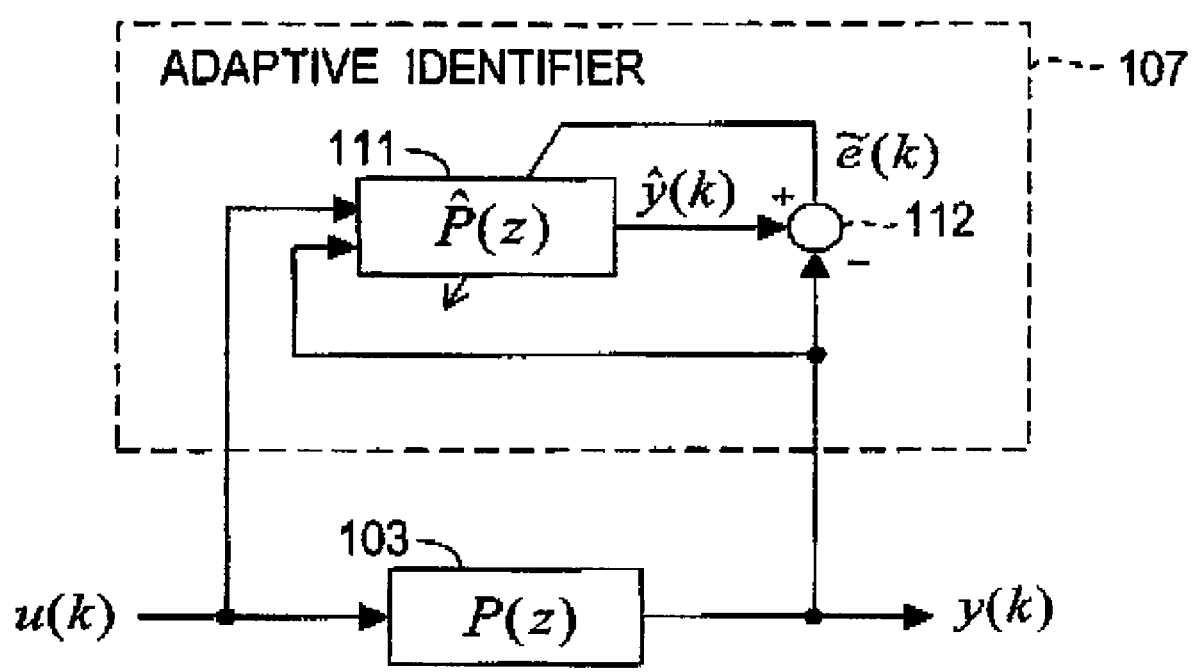
FIG. 11 is a block diagram showing a schematic structure of an adaptive identifier.
Figure 12:
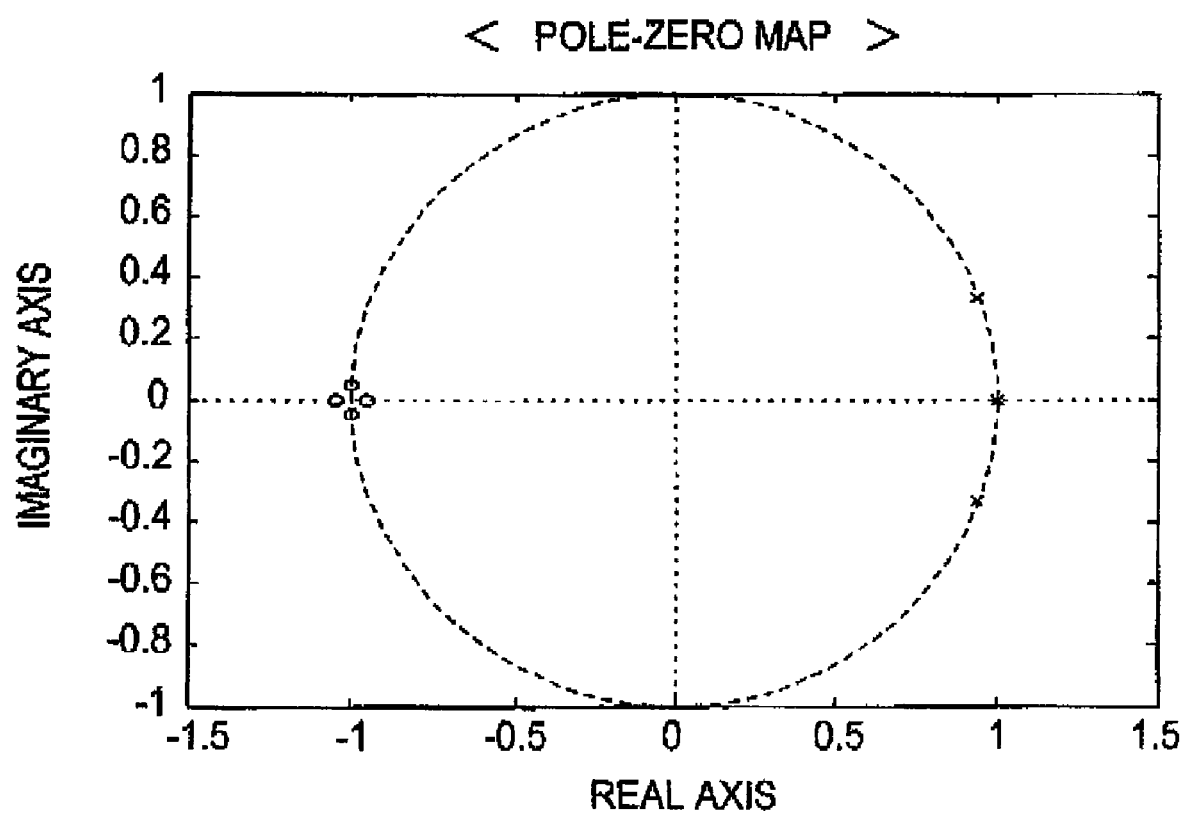
FIG. 12 is an explanatory view showing a pole-zero map of a transfer function model identified by a conventional adaptive update rule.
Figure 13:
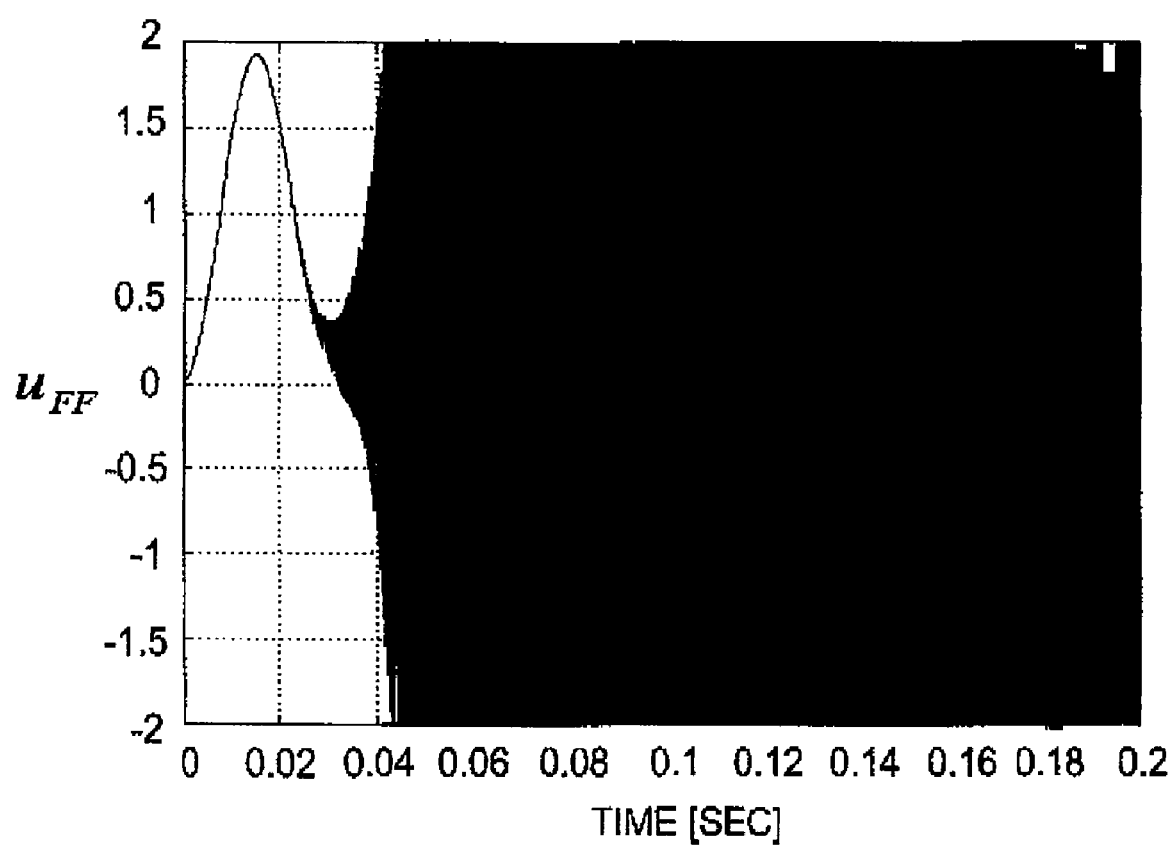
FIG. 13 is an explanatory view showing an example of feedforward manipulated variables generated by the feed forward controller using an inverse model of a transfer function model with unstable zero.

In the control device 57 configured as above, like the adaptive control system shown in FIG. 10, a double-degree-of-freedom control system is established which adopts an adaptive control technique. That is, in the control device 57, the feedforward controller 87 corresponds to the feedforward controller 110 of FIG. 10. The adaptive parameter calculator 88 corresponds to the adaptive identifier 107 of FIG. 10. The feedback controller 89 corresponds to the subtractor 104 and the feedback controller 102 of FIG. 10. The manipulated variable synthesizer 90 corresponds to the adder 105 of FIG. 10. The driving system from the motor 10 to the conveyor roller 41 as the controlled object corresponds to the controlled object 103 of FIG. 10. The control device 57 of the present embodiment is largely different from the adaptive control system of FIG. 10 in identification calculation of the discrete-time transfer function model P(z) by the adaptive parameter calculator 88.

In the adaptive identifier 107 of FIG. 10, the discrete-time transfer function model P(z) of the controlled object is expressed by equation (1) above. Then, the adaptive update rule of equation (8) is applied to equation (1) to estimate each coefficient of the numerator and the denominator. On the other hand, in the adaptive parameter calculator 88 of the present embodiment, the numerator of the discrete-time transfer function model P(z) of the controlled object having the numerator of $b(z+1)^4$ is not expanded as before. A single unknown coefficient b is directly estimated. This will be explained in particular below.

(4) Identification of Transfer Function Model

Figure 5:
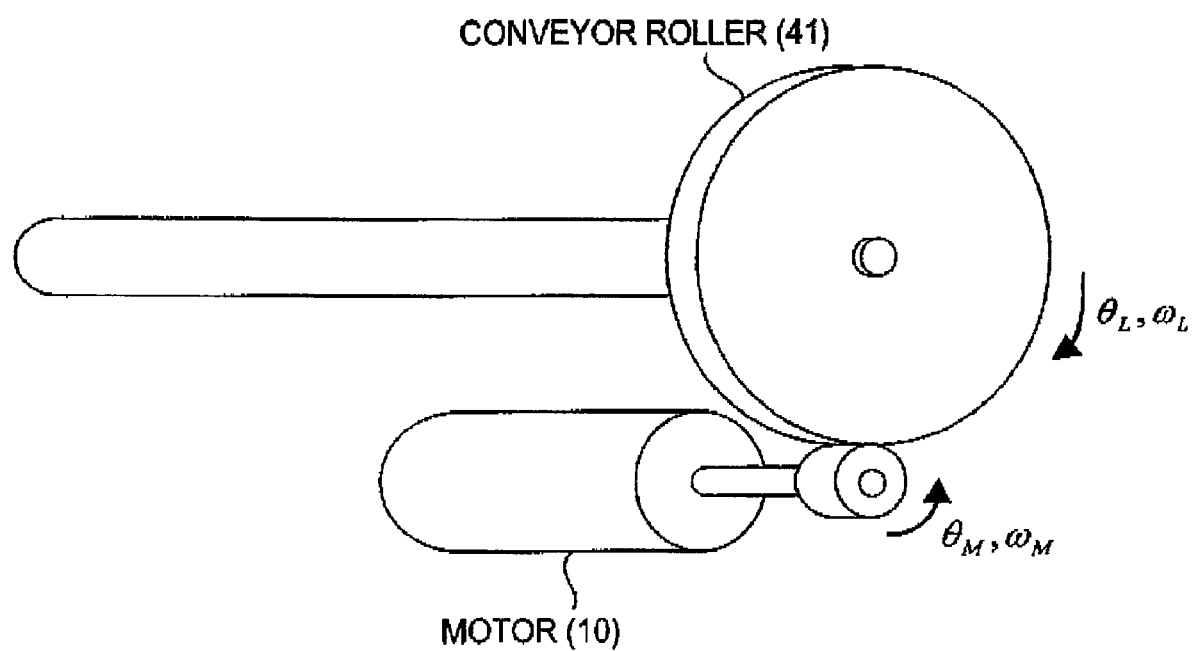
FIG. 5 is a view illustrating a simplified model of a controlled object.

Firstly, the transfer function model of the controlled object is obtained by applying equation of motion to the controlled object. The controlled object of the present embodiment can be roughly replaced with a simplified model as shown in FIG. 5. In such model, the equation of motion around the motor 10 can be expressed by equation (15) below.

$$T_M = K_T i = J_M \frac{d\omega_M}{dt} + D_M \omega_M + K_S \int (\omega_M - \omega_L) dt \quad (15)$$

Also, the equation of motion around the conveyor roller 41 can be expressed by equation (16) below.

$$J_L \frac{d\omega_M}{dt} + D_L \omega_L - K_S \int (\omega_M - \omega_L) dt = 0 \quad (16)$$

where $\theta_M$: motor angle displacement;
$\theta_L$: conveyor roller angular displacement;
$\omega_M$: motor angular velocity;
$\omega_L$: conveyor roller angle displacement;
$J_M$: motor inertia;
$J_L$: conveyor roller inertia,
$D_M$: motor axis viscosity resistance;
$D_L$: conveyor roller axis viscosity resistance;
$K_S$: twist constant between motor and conveyor roller;
$T_M$: motor torque;
$K_T$: torque constant; and
i: motor current A Laplace transform is performed on equations (15) and (16). Assuming that the motor current is I(s) and the conveyor roller angle displacement is $\Theta_T(s)$, a continuous-time transfer function model P(s) like equation (17) of the controlled object below is obtained.

$$P(s) = \frac{\Theta_L(s)}{I(s)} \quad (17)$$

$$= \frac{K_t K_s}{J_M J_L s^4 + (D_M J_L + D_L J_M) s^3 + \{K_s(J_M + J_L) + D_M D_K\} s^2 + K_s(D_M + D_L)s}$$

Replacing equation (17) with equation (18) below, equation (18) is transformed into a discrete-time transfer function model P(z) using bilinear transformation. Then, equation (19) below is established.

$$P(s) = \frac{b'}{s^4 + a'_4 s^3 + a'_3 s^2 + a'_2 s + a'_1} \quad (18)$$

$$P(z) = \frac{b'(z+1)^4}{(z-1)^4 + a'_4(z-1)^3(z+1) + a'_3(z-1)^2(z+1)^2 + a'_2(z-1)(z+1)^3 + a'_1(n+1)^4} \quad (19)$$

The discrete-time transfer function model P(z) of equation (19) is further reexpressed by equation (20) below.

$$P(z) = \frac{b(z+1)^4}{z^4 + a_4 z^3 + a_3 z^2 + a_2 z + a_1} \quad (20)$$

The adaptive parameter calculator 88 estimates each coefficient (parameter) of the numerator and the denominator of the discrete-time transfer function model P(z) of the controlled object expressed by equation (20). As a result, an identification model $\hat{P}(z)$ is obtained. At that time, the numerator is not expanded to a polynomial as in the conventional equation (3), A single unknown coefficient b is directly estimated. Particularly, calculation according to the adaptive update rule expressed by equation (21) below is repeated to update an identification coefficient $\hat{\theta}(k)$ that is an estimate of each coefficient b, $a_4$, $a_3$, $a_2$, $a_1$.

$$\hat{\theta}(k)=\hat{\theta}(k-1)-L\cdot v(k)\tilde{e}(k) \qquad (21)$$

where $\hat{\theta}(k)=[\hat{b},\hat{a}_n,\ldots,\hat{a}_1]$,
$v(k)=[u(k)+{}_nC_1u(k-1)+{}_nC_2u(k-1)+\ldots+{}_nC_nu(k-n),$
$\quad -y(k-1),\ldots,-y(k-n)]$,
$\tilde{e}(k)=y(k)-\hat{y}(k)$,
$\hat{y}(k)=\hat{\theta}^T(k-1)v(k)$,
u(k): manipulated variable,
y(k): controlled variable,
k: calculation timing, and L: adaptive gain Equation (21) is a general equation. In the present embodiment, equation (21) is calculated in case that n=4. Thereby, the identification coefficient $\hat{\theta}(k)$ approaches the actual coefficient of the discrete-time transfer function model P(z) of the controlled object. The difference between $\hat{\theta}(k)$ and $\hat{\theta}(k-1)$ is gradually reduced. In other words, the difference between the controlled variable y(k) of the discrete-time transfer function model P(z) and the controlled variable ŷ(k) of the identification model $\hat{P}(z)$ becomes gradually small so that $\tilde{e}(k)$ gradually comes close to zero. When $\tilde{e}(k)$ is equal to or below an update completion determination value due to approximate consistency between the result of calculation $\hat{\theta}(k)$ this time by a coefficient update calculator and the result of calculation $\hat{\theta}(k-1)$ of the previous time, calculation is ended to determine the identification model $\hat{P}(z)$ based on the identification coefficient $\hat{\theta}(k)$ at that point.

The identification model $\hat{P}(z)$ obtained as above is reflected in the feedforward controller 87. That is, the inverse model $1/\hat{P}(z)$ of the obtained identification model $\hat{P}(z)$ is used as a transfer function of the feedforward controller 87.

In detailed explanation on the adaptive update rule of equation (21), the discrete-time transfer function model P(z) of the controlled object defined by equation (20) is expressed by equation (22) below in the same manner as in equation (3) above.

$$P(z) = \frac{b(z^{-1}+1)^4}{1+a_4z^{-1}+a_3z^{-2}+a_2z^{-3}+a_1z^{-4}} \qquad (22)$$

Also, a relationship similar to the aforementioned equation (4) is established among P(z), u(k) and y(k). Thus, applying equation (22) to equation (4), equation (23) is obtained.

$$b(z^{-1}+1)^4 u(k)=(1+a_4z^{-1}+a_3z^{-2}+a_2z^{-3}+a_1z^{-4})y(k) \qquad (23)$$

Equation (23) can be reexpressed by equation (24) below.

$$\begin{aligned} y(k) &= b(1+4z^{-1}+6z^{-2}+4z^{-3}+z^{-4})u(k) - \\ &\quad (a_4z^{-1}+a_3z^{-2}+a_2z^{-3}+a_1z^{-4})y(k) \\ &= b\{u(k)+4u(k-1)+6u(k-2)+4u(k-3)+u(k-4)\} - \\ &\quad a_4y(k-1)-a_3y(k-2)-a_2y(k-3)-a_1y(k-4) \end{aligned} \qquad (24)$$

The respective coefficients of the transfer function model P(z) of the controlled object are defined as $\theta=[b,a_4,a_3,a_2,a_1]$ in a collective manner. Then, equation (24) can be defined by equation (25) below.

$$y(k)=f^{Y}v(k) \qquad (25)$$

Accordingly, the output ŷ(k) from the identification model $\hat{P}(z)$ can be expressed by equation (26) below, as noted in 'where' clause of equation (21).

$$\hat{y}(k)=\hat{\theta}^Y(k-1)v(k) \qquad (26)$$

Figure 6:
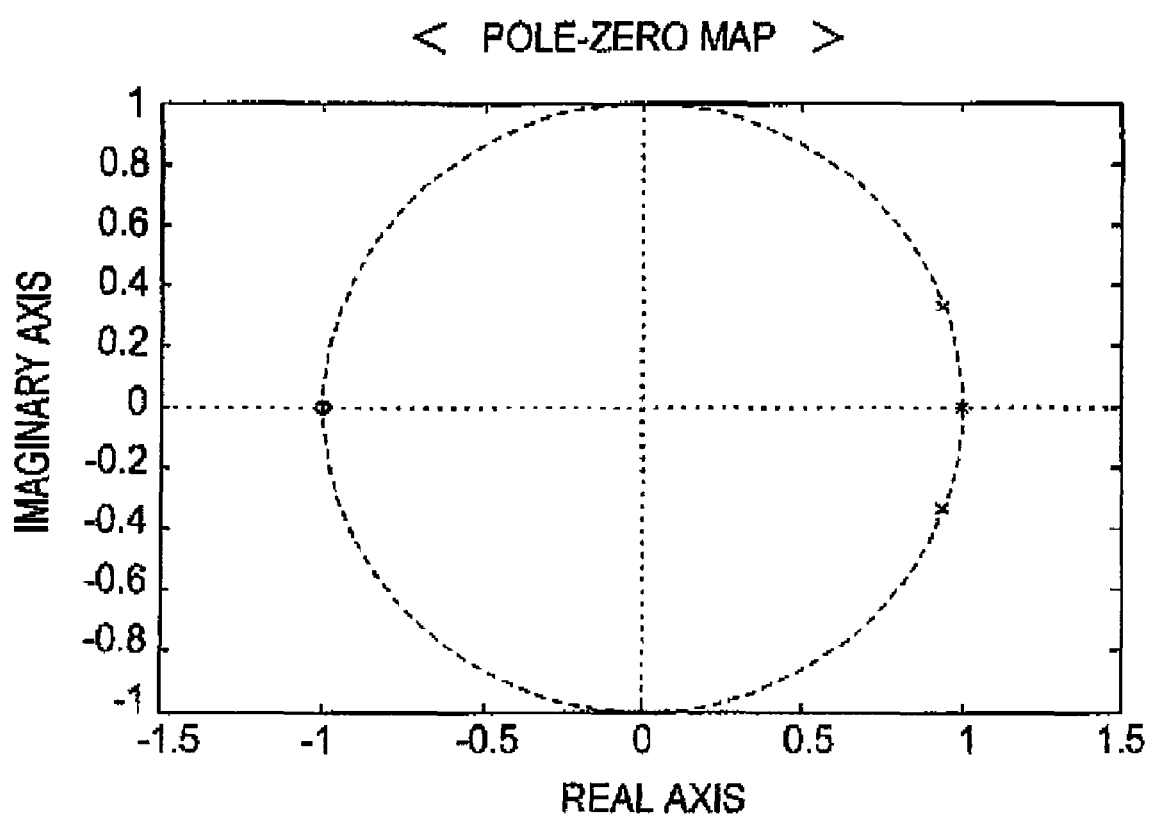
FIG. 6 is an explanatory view showing a pole-zero map of a transfer function model identified by an adaptive parameter calculator of the embodiment.

FIG. 6 shows a pole-zero map of the identification model $\hat{P}(z)$ obtained by the adaptive parameter calculator 88. As is clear from FIG. 6, the zero point remains fixed, and no unstable zero point appears. This is because identification is performed without polynomial expansion of the numerator of the discrete-time transfer function model P(z) of the controlled object defined by equation (22) (i.e., as the zero point remains fixed).

TABLE 2 shows an example of the result of identification calculated by the adaptive parameter calculator 88 of the present embodiment.

TABLE 2

| | Value Resulted from Identification of Numerator Coefficient |
|---|---|
| b | 1.715134515011557e−3 |
| $\hat{b}$ | 1.715134517080053e−3 |

TABLE 2 shows only the numerator coefficient of equation (22). In TABLE 2, b is a predetermined simulated value, and $\hat{b}$ is the result of estimation (identification) in the present embodiment. As seen from TABLE 2, estimation of the coefficient is favorably achieved. Estimation accuracy of the coefficient is equivalent to or higher than the conventional manner.

Figure 7:
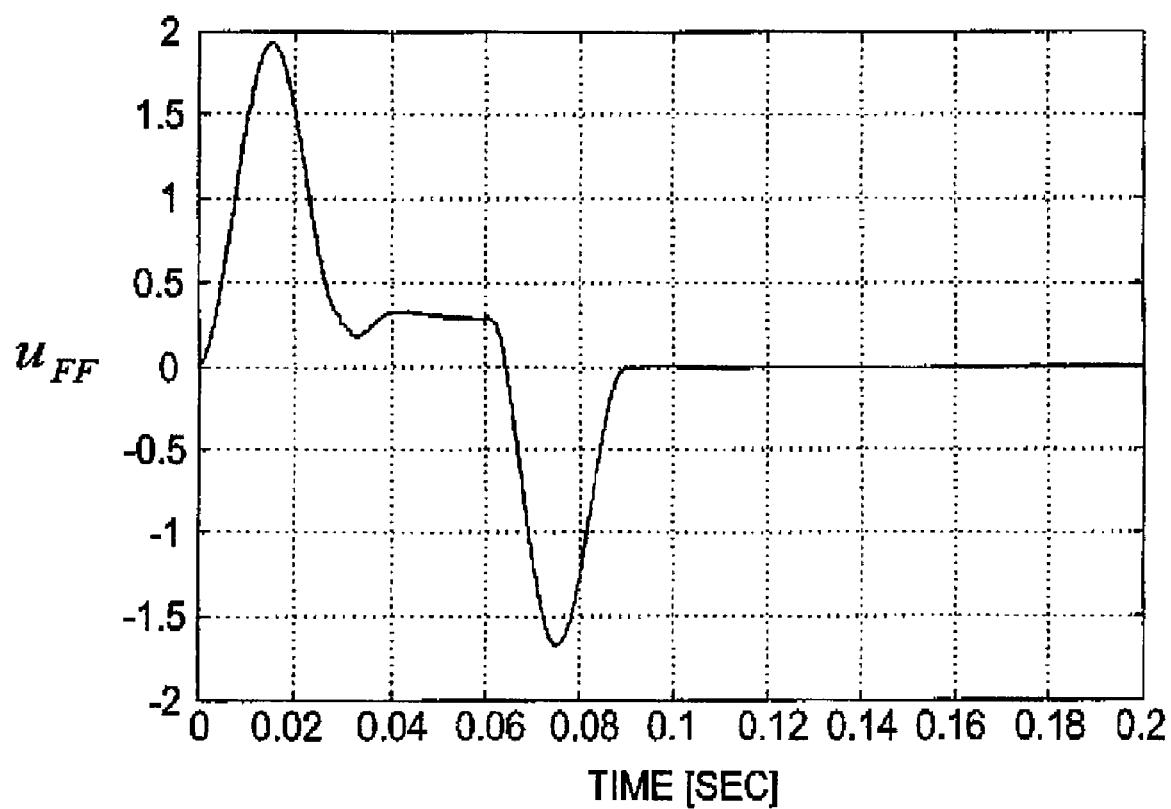
FIG. 7 is an explanatory diagram showing an example of feedforward manipulated variables generated by a feedforward controller of the embodiment.

As above, there is no unstable zero point in the identification model $\hat{P}(z)$. Moreover, identification of each coefficient is favorably performed. Thus, use of the inverse model of the identification model $\hat{P}(z)$ in the feedforward controller 87 does not destabilize the overall system. Accordingly, the feedforward manipulated variable $u_{FF}$ from the feedforward controller 87 is also stable as shown in FIG. 7.

Now, an identification calculation process performed in the adaptive parameter calculator 88 will be explained by way of FIG. 8. The adaptive parameter calculator 88 is designed as a so-called hardware circuit which performs various calculations for identification. However, the identification calculation sequence as a hardware circuit here is replaced with a flowchart for the sake of easy understanding.

Figure 8:
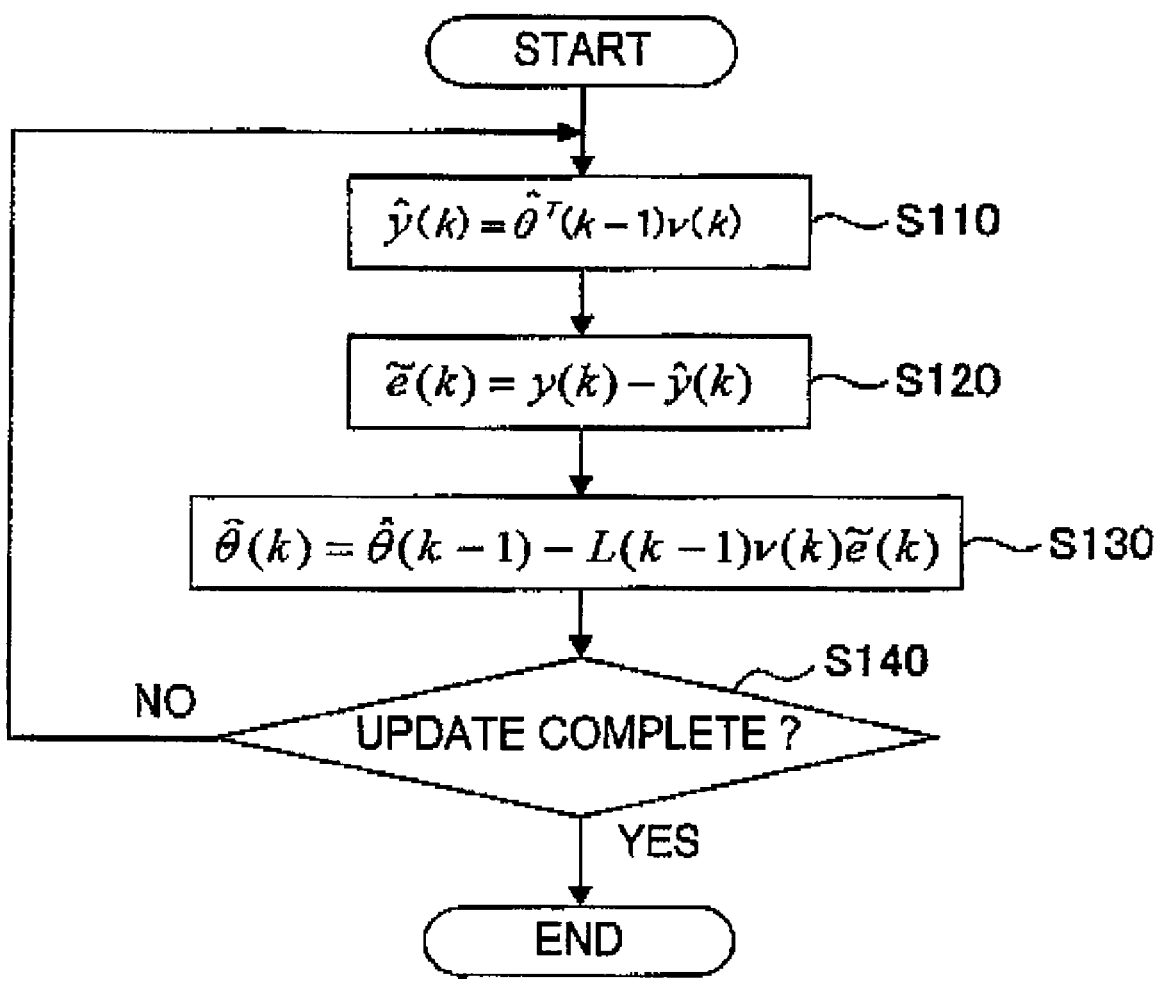
FIG. 8 is a flowchart showing an identification calculation process according to the embodiment.
Figure 9:
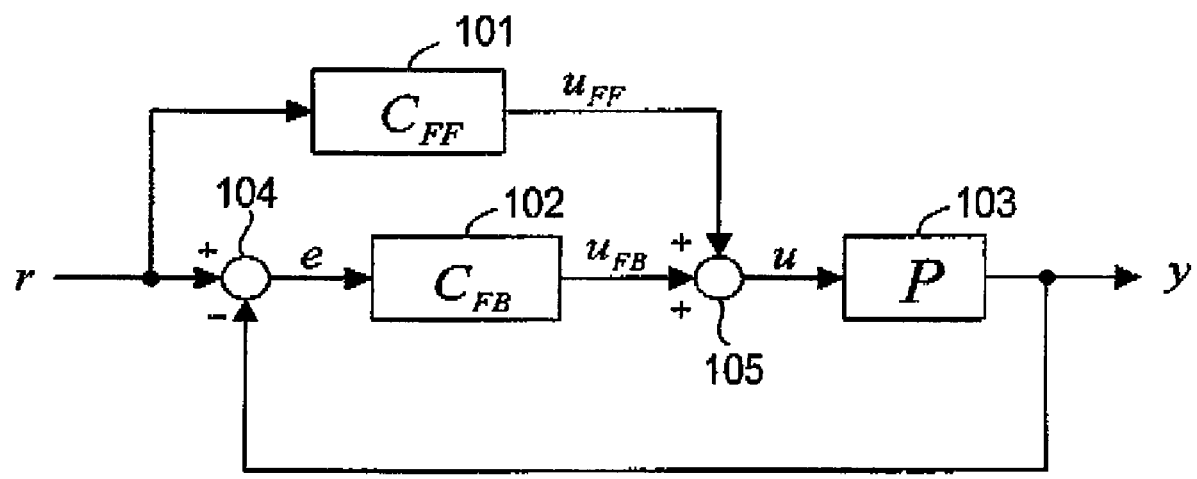
FIG. 9 is a block diagram showing a schematic structure of a conventional double-degree-of-freedom control system.

The identification calculation process in FIG. 8 is performed at parameter adjustment upon product shipping, power-on of the multi function apparatus 1, maintenance of each portion of the multi function apparatus 1 concerning its operation (maintenance mode), exchange of ink, jamming of the paper P, etc. The identification calculation process may be designed to be performed, for example, when an installed temperature sensor indicates a predetermined temperature or above, in consideration of the characteristic change due to ambient temperature, or when certain time is measured by a clock, in consideration of the characteristic change due to aging. However, these are only the examples. At what timing the identification is performed can be arbitrarily determined.

When the identification calculation process of FIG. 8 is started, calculation by equation (26), that is, calculation of the controlled variable ŷ(k) of the identification model P̂(z), is performed in S110. Subsequently in S120, calculation of ẽ(k) is performed.

Based on the obtained ŷ(k) and ẽ(k), the identification coefficient θ̂(k) by the adaptive update rule of equation (21) is calculated in S130. In S140, it is determined whether the update (i.e., identification) is complete. That is, it is determined whether the calculated θ̂(k) is approximately consistent with the previously calculated θ̂(k−1) and ẽ(k) is equal to or below the predetermined update completion determination value. If it is determined that the update is complete, the identification calculation process is ended. Otherwise, the steps of S110 onwards (calculation) are repeated until the update is complete.

As is clear from v(k) described in 'where' clause of equation (21), if the identification calculation process of FIG. 8 is to be performed, it is necessary to obtain y(k−1), y(k−2), . . . , y(k−n) which are controlled variables for at least n times in advance.

(5) Effect of Embodiment

As noted above in detail, in the multi function apparatus 1 of the present embodiment, a double-degree-of-freedom system including feedback control and feedforward control is implemented in the control device 57 (see FIG. 4). Moreover, the multi function apparatus 1 includes an adaptive control device (i.e., the multi function apparatus 1 is designed such that the result of identification by the adaptive parameter calculator 88 is reflected in the feedforward controller 87). The adaptive parameter calculator 88 estimates the single unknown coefficient b of the numerator of the discrete-time transfer function model P(z) of the controlled object without polynomial expansion and with the fixed zero point.

Accordingly, even if the result of estimation causes error, there is no unstable zero point in the identification model P̂(z) regardless of the magnitude of the error. Thus, the feedforward controller 87 can generate the stable feedforward manipulated variable $u_{FF}$. Control performance in paper conveyance can be favorably maintained. Moreover, the coefficient to be estimated regarding the numerator of P(z) is just one (i.e., b) regardless of the degree of z. Thus, time necessary for identification can be shortened.

Particularly, the controlled object of paper conveyance control in the present embodiment is defined by a zeroth-degree/nth-degree continuous-time transfer function model P(s) like equation (17) above. Then, the model P(s) is transformed into the discrete-time transfer function model P(z) expressed by equation (20) above. That is, the zero point of the discrete-time transfer function model P(z) exists at stability limit. Therefore, the identification model P̂(z) may have an unstable zero point in the conventional identification technique as already explained. However, in the present embodiment, the numerator coefficient b is estimated with the zero point fixed as noted above. Thus, there is no unstable zero point in the identification model P̂(z).

(6) Variations

The present invention is not limited to the above described embodiment. The present invention can be practiced in various manners without departing from the technical scope of the invention.

For instance, in the above embodiment, identification is performed with a zeroth-degree/nth-degree continuous-time transfer function model P(s) of the controlled object, which is transformed into a discrete-time transfer function model P(z) having the numerator of $b(z+1)^4$. However, this is only an example. If the numerator is defined by $b(z\pm1)^n$ or $b(z\pm1)^m g(z)$ (where g(z) is an expression of degree n−m of z), or if a discrete-time transfer function model P(z) is defined by equation (27) and has no unstable zero point, the present invention can be adapted to such controlled object. The case in which the numerator is defined by $b(z\pm1)^n$ or $b(z\pm1)^m g(z)$ (where g(z) is an expression of degree n−m of z) eventually results in the form of equation (27).

$$P(z) = \frac{b(z^n + h_n z^{n-1} + \ldots + h_2 z + h_1)}{z^n + a_n z^{n-1} + \ldots + a_2 z + a_1} \quad (27)$$

where b, $a_1, \ldots, a_n$: unknown coefficient, and
$h_1, \ldots, h_n$: known real number In this case, the adaptive parameter calculator 88 may perform calculation in accordance with the adaptive update rule of equation (28) in the same manner as in the above embodiment.

$$\hat{\theta}(k) = \hat{\theta}(k-1) - L \cdot v(k)\tilde{e}(k) \quad (28)$$

where
$\hat{\theta}(k) = [\hat{b}, \hat{a}_n, \ldots, \hat{a}_1]$,
$v(k) = [u(k) + h_n u(k-1) + h_{n-1} u(k-2) + \ldots + h_1 u(k-n), -y(k-1), \ldots, -y(k-n)]$,
$\tilde{e}(k) = y(k) - \hat{y}(k)$
$\hat{y}(k) = \hat{\theta}^T(k-1)v(k)$
u(k): manipulated variable,
y(k): controlled variable,
k: calculation timing, and L: adaptive gain Only difference between equation (28) and equation (21) in the above embodiment is found in v(k).

Also, the above embodiment explains the case in which the adaptive control technique of the present invention is applied to a double-degree-of-freedom control system. However, the adaptive control technique of the present invention can be applied to any adaptive control device which is designed to identify a transfer function model of a controlled object and reflect the result of identification in various control units.

Moreover, in the above embodiment, identification of the discrete-time transfer function model P(z) of the controlled object is executed by the adaptive parameter calculator 88 as a hardware circuit. Instead, a program that makes a computer execute the aforementioned identification calculation process of FIG. 8 may be created and installed in the computer to perform the identification. That is, the identification calculation process can be performed by either hardware or software.

For example, the above program may be stored in the ROM inside the CPU 51 to be executed by the CPU 51.

Alternatively, the above program may be downloaded from the outside of the multi function apparatus 1 to the CPU 51 by a carrier to be executed by the CPU 51.

Also, in the above embodiment, the present invention is applied to control of paper conveyance. However, the present invention may be applied to movement of the recording head 15.

What is claimed is:

1. An image forming apparatus comprising:
   a conveyor device that conveys a recording medium along a predetermined conveyor path;
   an image forming device that forms an image on the recording medium conveyed by the conveyor device; and
   an adaptive control device including
      an identifier that estimates an unknown coefficient in a discrete-time transfer function model P(z) (z: delay operator) of a controlled object, base on a manipulated variable supplied to the controlled object and a controlled variable of the controlled object to the manipulated variable, to identify the discrete-time transfer function model P(z), a feedforward controller that is expressed by a discrete-time transfer function model using an inverse model 1/P̂(z) of an identification model P̂(z) which is resulted from identification by the identifier and that generates a feedforward manipulated variable as at least a part of the manipulated variable to an input control target value, wherein the controlled object is configured such that the discrete-time transfer function model P(z) of the controlled object is expressed by equation (i), $$P(z) = \frac{b(z^n + h_n z^{n-1} + \ldots + h_2 z + h_1)}{z^n + a_n z^{n-1} + \ldots + a_2 z + a_1} \quad (i)$$

where $b, a_1, \ldots, a_n$: unknown coefficient, and $h_1, \ldots, h_n$: known real number, the identifier, when estimating each coefficient $b, a_1, \ldots, a_n$ of the discrete-time transfer function model P(z) of equation (i), estimates a single unknown coefficient b of numerator in non-expanded form of the numerator.

wherein the adaptive control device controls, as the controlled object, a motor and a driving mechanism driven by the motor of the image forming apparatus.

2. The image forming apparatus according to claim 1, wherein the discrete-time transfer function model P(z) has no unstable zero point.

3. The image forming apparatus according to claim 2, wherein the discrete-time transfer function model P(z) is expressed by equation (i) having a numerator defined by $b(z\pm1)^n$.

4. The image forming apparatus according to claim 2, wherein the discrete-time transfer function model P(z) is expressed by equation (i) having a numerator defined by $b(z\pm1)^m g(z)$ (where g(z) is an expression of degree n−m of z).

5. The image forming apparatus according to claim 1, wherein the discrete-time transfer function model P(z) is obtained by transforming into a discrete-time transfer function a continuous-time transfer function model P(s) (s: differential operator) of the controlled object introduced by applying physical law to the controlled object.

6. The image forming apparatus according to claim 5, wherein the continuous-time transfer function model P(s) is defined by expression of degree zero/n of s.

7. The image forming apparatus according to claim 6, wherein the discrete-time transfer function model P(z) is obtained by transforming the continuous-time transfer function model P(s) into a discrete-time system by bilinear transform, and the numerator of the discrete-time transfer function model P(z) is defined by $b(z+1)^n$.

8. The image forming apparatus according to claim 1, wherein the identifier includes a coefficient update calculator that repeats calculation in accordance with adaptive update rule defined by equation (ii) to update an identification coefficient $\hat{\theta}(k)$ that is an estimate of each coefficient $b, a_1, \ldots, a_n$, $$\hat{\theta}(k) = \hat{\theta}(k-1) - L \cdot v(k) \tilde{e}(k) \quad (ii)$$

where
$\hat{\theta}(k) = [\hat{b}, \hat{a}_n, \ldots, \hat{a}_1]$,
$v(k) = [u(k) + h_n u(k-1) + h_{n-1} u(k-2) + \ldots + h_1 u(k-n), -y(k-1), \ldots, -y(k-n)]$,
$\tilde{e}(k) = y(k) - \hat{y}(k)$,
$\hat{y}(k) = \hat{\theta}^T(k-1) v(k)$,
u(k): manipulated variable,
y(k): controlled variable,
k: calculation timing, and
L: adaptive gain, an identification completion determiner that determines that identification is completed when $\tilde{e}(k)$ in equation (ii) is equal to or below a predetermined update completion determination value.

9. The image forming apparatus according to claim 1 further comprising a feedback controller that compares the control target value with an actual controlled variable of the controlled object and generates a manipulated variable depending on error between the control target value and the actual controlled variable as a feedback manipulated variable such that the error is reduced, and a manipulated variable synthesizer that adds the feedback manipulated variable from the feedback controller to the feedforward manipulated variable from the feedforward controller to supply the sum as the manipulated variable to the controlled object.

10. The image forming apparatus set forth in claim 1 wherein the driving mechanism is a part of the conveyor device.

11. The image forming apparatus set forth in claim 1 wherein the driving mechanism is a part of the image forming device.

12. The image forming apparatus set forth in claim 1 wherein the image forming device ejects ink onto the recording medium to form an image on the recording medium.

* * * * *